US012326242B2

(12) United States Patent
Wood et al.

(10) Patent No.: US 12,326,242 B2
(45) Date of Patent: Jun. 10, 2025

(54) LIGHTING FRAME

(71) Applicant: ABL IP HOLDING, LLC, Conyers, GA (US)

(72) Inventors: Clifford T. Wood, Grayson, GA (US); Jeff Robert Shaner, Loganville, GA (US)

(73) Assignee: ABL IP HOLDING, LLC, Atlanta, GA (US)

(*) Notice: Subject to any disclaimer, the term of this patent is extended or adjusted under 35 U.S.C. 154(b) by 0 days.

(21) Appl. No.: 18/383,500

(22) Filed: Oct. 25, 2023

(65) Prior Publication Data

US 2024/0142093 A1 May 2, 2024

Related U.S. Application Data

(60) Provisional application No. 63/380,967, filed on Oct. 26, 2022.

(51) Int. Cl.

*F21V 19/00* (2006.01)
*F21S 8/02* (2006.01)

(52) U.S. Cl.

CPC .......... *F21V 19/0045* (2013.01); *F21S 8/026* (2013.01)

(58) Field of Classification Search

CPC ....... F21V 19/0045; F21V 15/01; F21S 8/026
See application file for complete search history.

(56) References Cited

U.S. PATENT DOCUMENTS

2013/0242608 A1* 9/2013 Chen ...................... G09F 13/18
362/611

* cited by examiner

*Primary Examiner* — Anne M Hines
*Assistant Examiner* — Jose M Diaz
(74) *Attorney, Agent, or Firm* — Grossman, Tucker, Perreault & Pfleger, PLLC

(57) ABSTRACT

A lighting fixture may include a housing, an illumination source disposed within the housing, and a frame coupled to the housing. The frame may include a first side and a second side abutting the first side to form a joint, wherein a gap extends at the joint and at least one of the first side or the second side is configured to obscure at least a portion of the gap.

21 Claims, 15 Drawing Sheets

LIGHTING FRAME

CROSS-REFERENCE TO RELATED APPLICATIONS

The present application claims the benefit of U.S. Provisional Application Ser. No. 63/380,967, entitled Lighting Frame, filed on Oct. 26, 2022, which is fully incorporated herein by reference.

TECHNICAL FIELD

The present disclosure is generally directed to lighting fixtures and more specifically to a lighting fixture frame configured to mitigate unintended light leakage from joints of the frame.

BACKGROUND INFORMATION

Building lighting systems may include a variety of lighting fixtures including ceiling fixtures, wall fixtures, freestanding fixtures, and/or any other type of lighting fixture. Ceiling fixtures may include recessed fixtures, pendant fixtures, track/rail fixtures, and/or any other ceiling mounted lighting fixture. Recessed lighting fixtures may include a frame, a housing coupled to the frame, and an illumination source (e.g., a fluorescent bulb, an incandescent bulb, a light emitting diode (LED), and/or any other illumination source) disposed within the housing. An example frame includes three or more sides, wherein two sides abut to form a joint. A gap may be present at the joint (e.g., as a result of manufacturing tolerances) that allows light to pass therethrough. Light passing through the gap may have an adverse effect on the aesthetic appearance of the recessed fixture. While the gap may be at least partially covered using a separate component (e.g., an adhesive backed material), such a configuration may be prone to failure (e.g., an adhesive failing due to age, heat, and/or the like) and/or assembly challenges (e.g., a separate part for each gap).

BRIEF DESCRIPTION OF THE DRAWINGS

These and other features and advantages will be better understood by reading the following detailed description, taken together with the drawings, wherein.

DETAILED DESCRIPTION

The present disclosure is generally directed to a lighting fixture. The lighting fixture includes a frame defining an open area, a housing coupled to the frame and defining a cavity, an illumination source disposed within the cavity and configured to generate light, and a diffuser extending over the open area through which the generated light passes. The frame includes a first side and a second side. A distal end of the first side abuts with a distal end of a second side to form a joint. A gap extends at the joint, wherein at least one of the first side and/or the second side is configured to obscure at least a portion of the gap.

Figure 1:
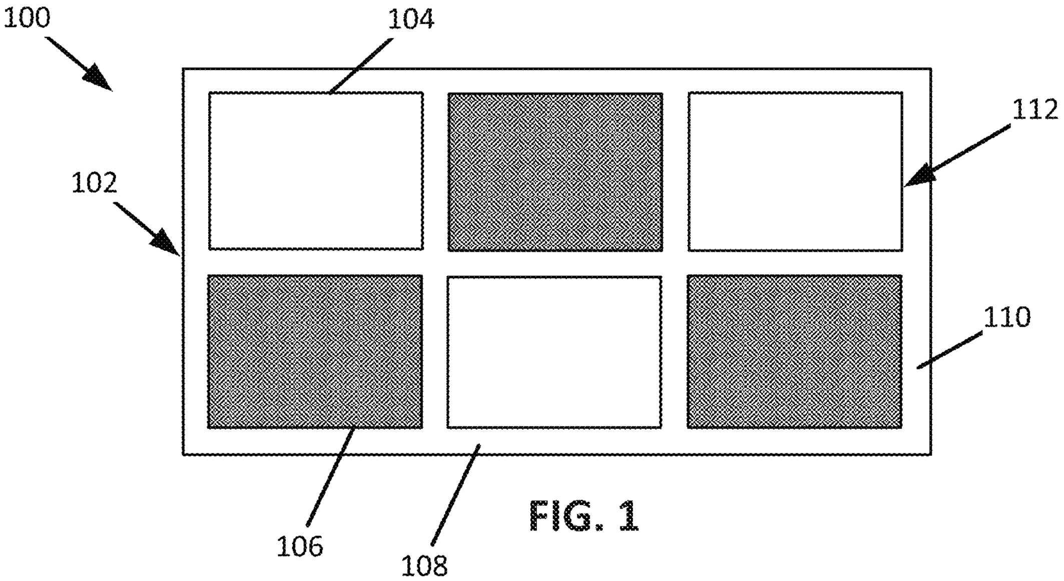
FIG. 1 shows a schematic example of a portion of a ceiling, consistent with embodiments of the present disclosure.

FIG. 1 shows a schematic example of a portion of a ceiling 100. As shown, the ceiling 100 includes a support grid 102 (e.g., a T-grid), a plurality of ceiling tiles 104 supported on the support grid 102, and at least one lighting fixture 106 supported on the support grid 102. The support grid 102 may include one or more first supports 108 and one or more second supports 110, the first supports 108 extending transverse to (e.g., perpendicular to) the second supports 110. For example, the first and second supports 108 and 110 may be arranged to define a plurality of openings 112 (e.g., rectangular openings), wherein at least a portion of a ceiling tile 104 or a lighting fixture 106 extends over the opening 112.

Figure 2:
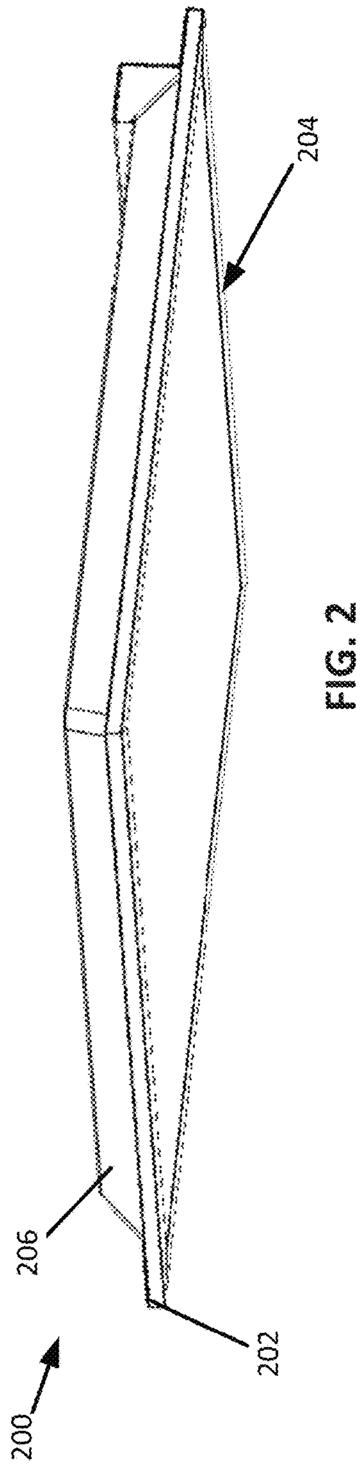
FIG. 2 shows a perspective view of a lighting fixture, consistent with embodiments of the present disclosure.
Figure 3:
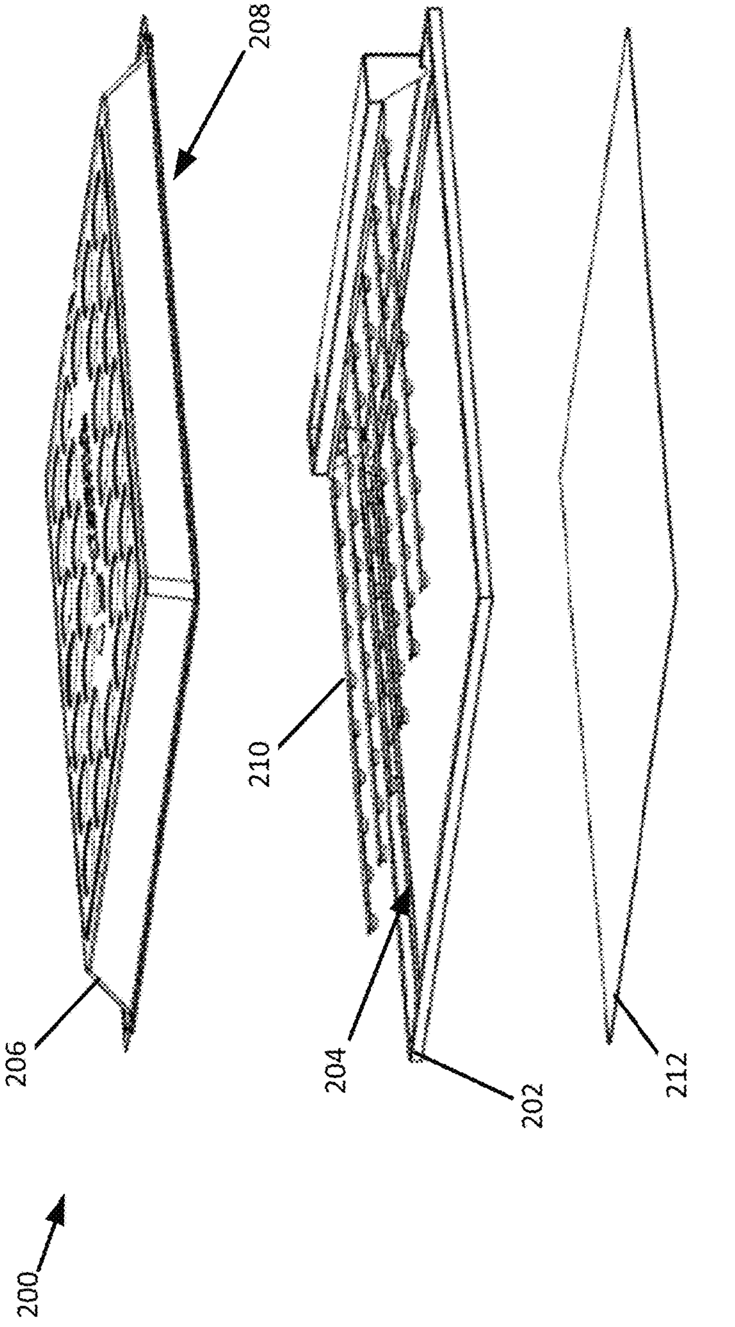
FIG. 3 shows an exploded perspective view of the lighting fixture of FIG. 2, consistent with embodiments of the present disclosure.

FIG. 2 shows a perspective view of a lighting fixture 200, which is an example of the lighting fixture 106 of FIG. 1, and FIG. 3 shows an exploded perspective view of the lighting fixture 200. As shown, the lighting fixture 200 includes a frame 202 defining an open area 204, a housing 206 coupled to the frame 202, an illumination source 210 disposed within the housing 206 (e.g., within a cavity 208 defined by the housing 206) and configured to generate light, and a diffuser 212 extending over the open area 204 and through which the generated light passes. The frame 202 and diffuser 212 may be generally referred to as forming a lighting fixture panel. The illumination source 210 may be one or more of, for example, a fluorescent bulb, an incandescent bulb, a light emitting diode (LED), and/or any other illumination source.

Figure 4:
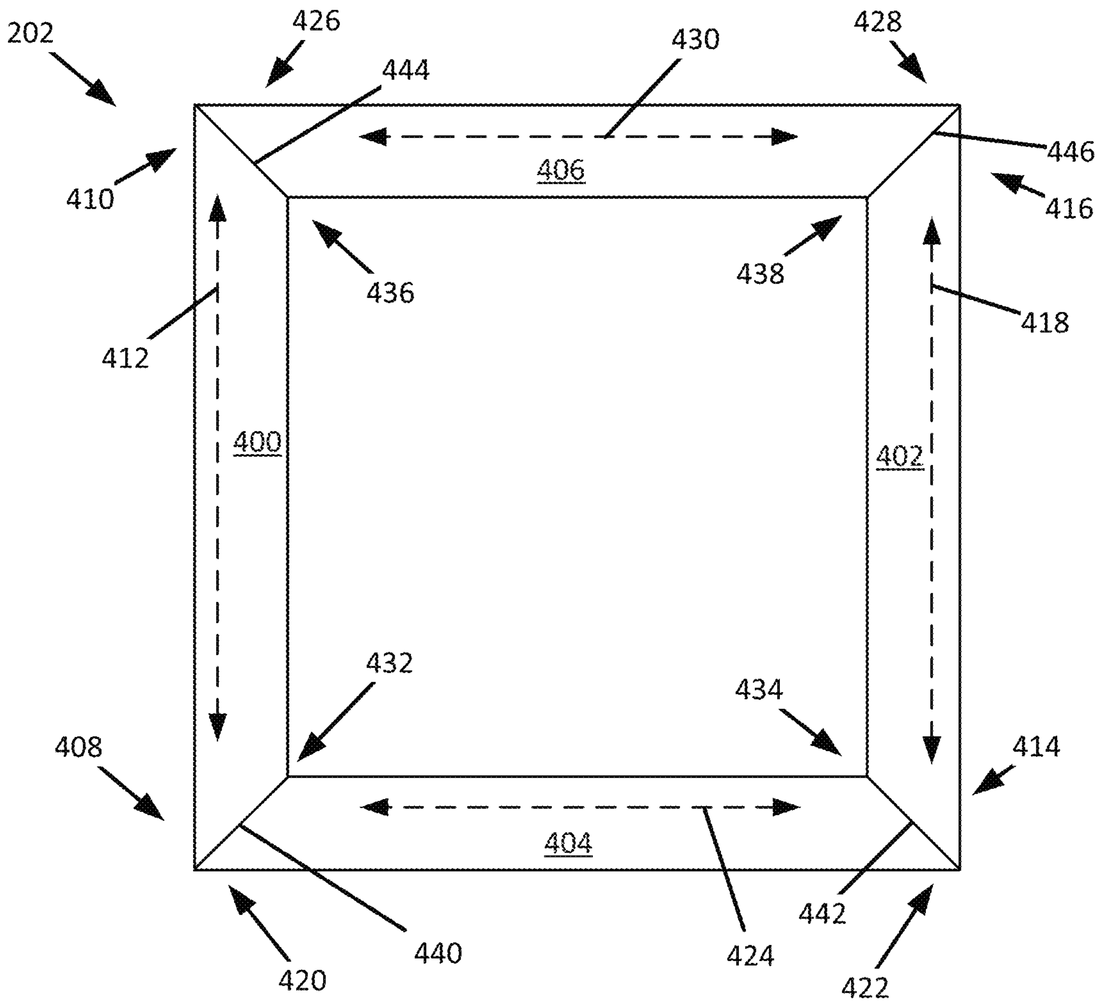
FIG. 4 shows a schematic example of a frame of the lighting fixture of FIG. 2, consistent with embodiments of the present disclosure.

FIG. 4 shows a schematic front view of the frame 202. As shown, the frame 202 includes a first side 400, a second side 402, a third side 404, and a fourth side 406. The first side 400 includes a first side first distal end 408 opposite a first side second distal end 410 along a longitudinal axis 412 of the first side 400. The second side 402 includes a second side first distal end 414 and a second side second distal end 416 opposite the second side first distal end 414 along a longitudinal axis 418 of the second side 402. The first side 400 and second side 402 form opposing sides of the frame 202. The third side 404 includes a third side first distal end 420 opposite a third side second distal end 422 along a longitudinal axis 424 of the third side 404. The fourth side 406 includes a fourth side first distal end 426 and a fourth side second distal end 428 opposite the fourth side first distal end 426 along a longitudinal axis 430 of the fourth side 406. The third side 404 and fourth side 406 form opposing sides of the frame 202.

The third side first distal end 420 abuts the first side first distal end 408 forming a first joint 432 and the third side second distal end 422 abuts the second side first distal end 414 forming a second joint 434. The fourth side first distal end 426 abuts the first side second distal end 410 forming a third joint 436 and the fourth side second distal end 428 abuts the second side second distal end 416 forming a fourth joint 438. A gap 440, 442, 444, and 446 may be present at one or more of (e.g., at each of) the first, second, third, and fourth joints 432, 434, 436, and/or 438, respectively. The gaps 440, 442, 444, and 446, absent an obstruction, may allow light to pass therethrough (which may generally be referred to as passthrough light). To mitigate (e.g., prevent) passthrough light, at least one of the first, second, third, and/or fourth sides 400, 402, 404, and/or 406 is/are configured to obscure at least a portion of a respective gap 440, 442, 444, and/or 446.

Figure 5:
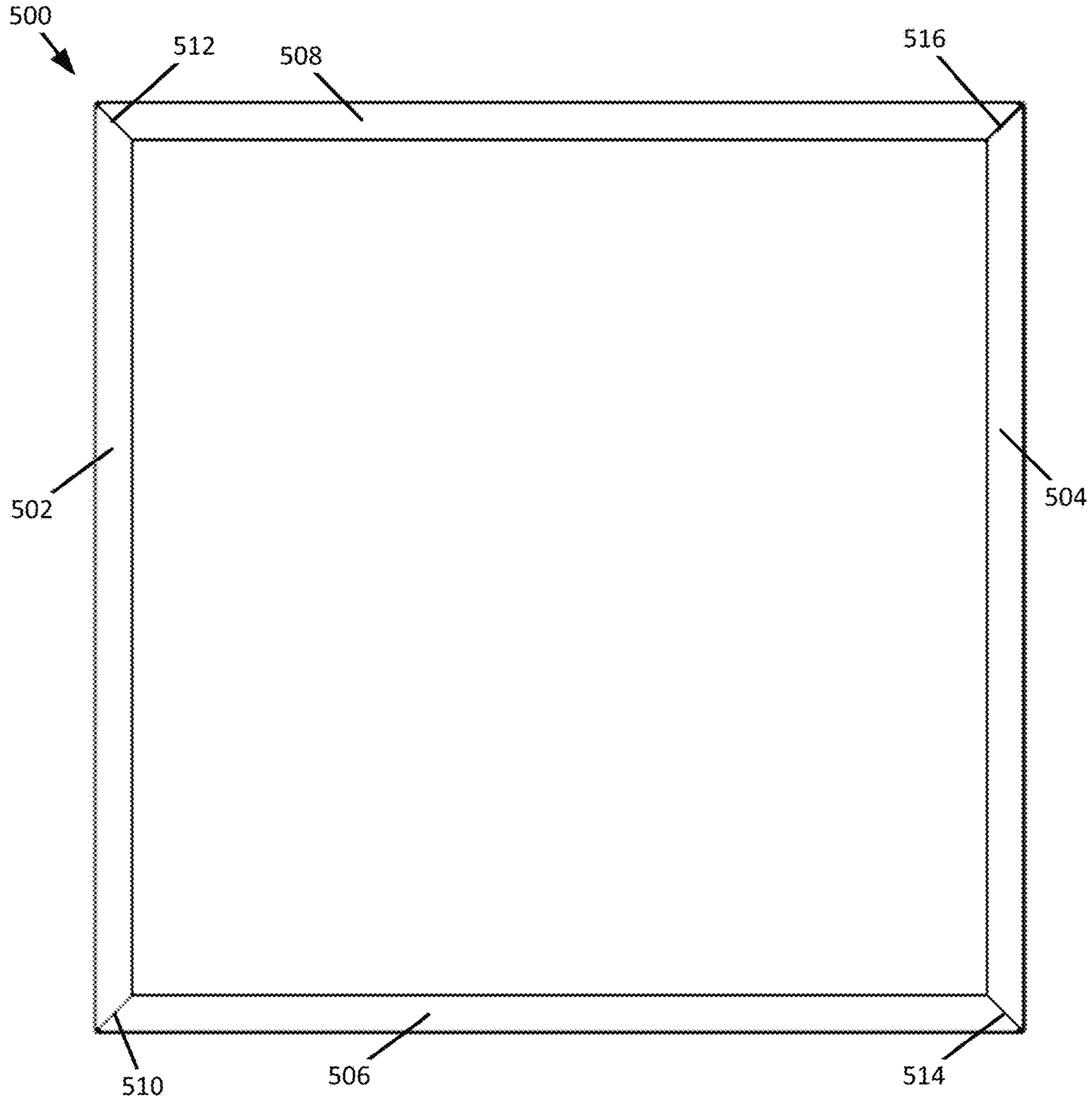
FIG. 5 shows a side view of an example of a frame for a lighting fixture, consistent with embodiments of the present disclosure.

FIG. 5 shows a frame 500, which is an example of the frame 202 of FIG. 2. As shown, the frame 500 includes a first side 502, a second side 504, a third side 506, and a fourth side 508. Opposing distal ends of the first side 502 abut corresponding distal ends of the third side 506 and the fourth side 508 to form first and second joints 510 and 512. Opposing distal ends of the second side 504 abut corresponding distal ends of the third side 506 and the fourth side 508 to form third and fourth joints 514 and 516.

Figure 6:
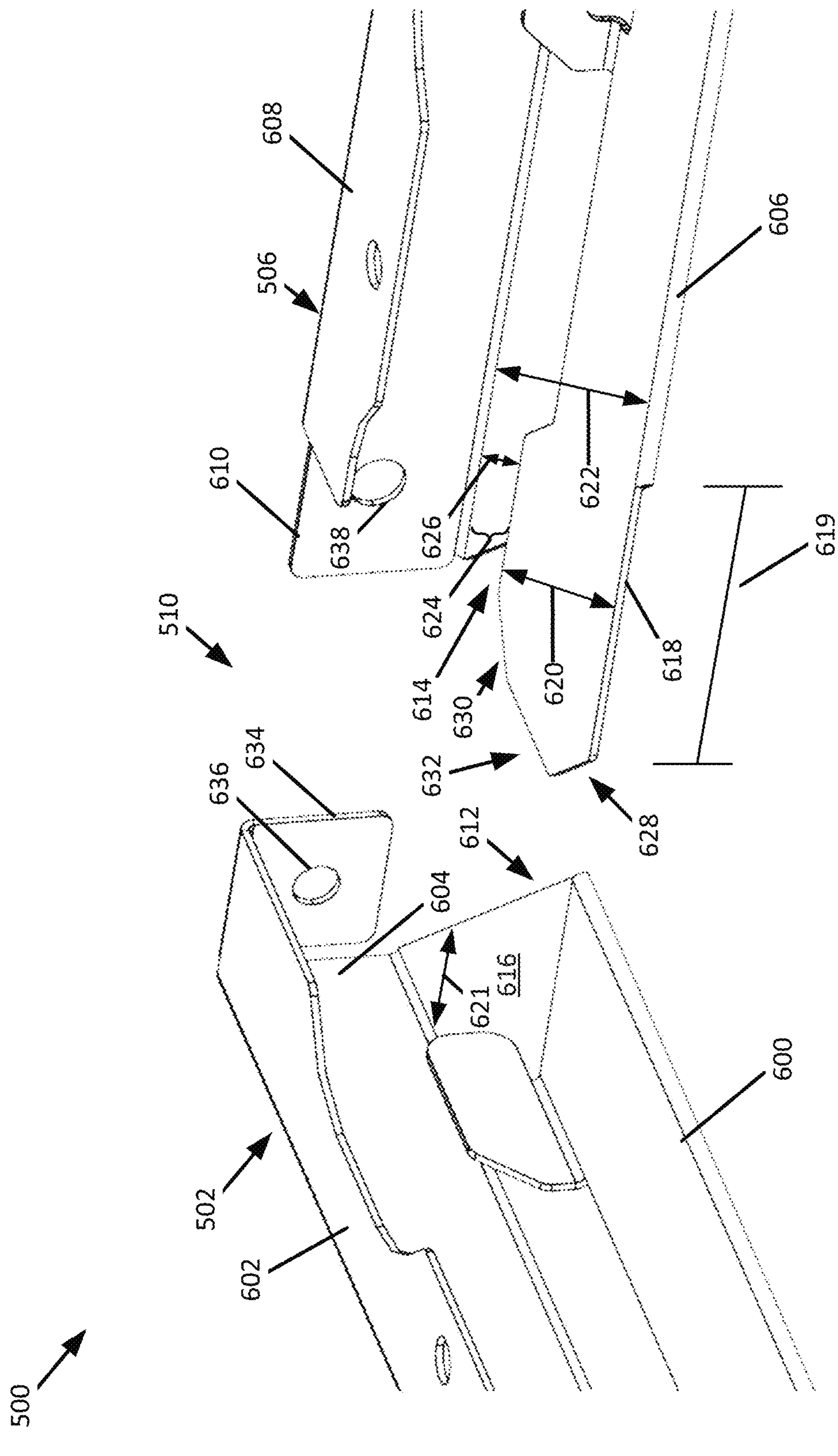
FIG. 6 shows an exploded perspective view of a joint of the frame of FIG. 5, consistent with embodiments of the present disclosure.

FIG. 6 shows a magnified exploded view of a portion of the frame 500 that includes the first joint 510. As shown, the first side 502 includes a first side room facing sidewall 600, a first side ceiling facing sidewall 602 vertically spaced apart from the first side room facing sidewall 600, and a first side upstanding sidewall 604 extending from the first side room facing sidewall 600 to the first side ceiling facing sidewall 602. As also shown, the third side 506 includes a third side room facing sidewall 606, a third side ceiling facing sidewall 608 vertically spaced apart from the third side room facing sidewall 606, and a third side upstanding sidewall 610 extending from the third side room facing sidewall 606 to the third side ceiling facing sidewall 608.

The first side room facing sidewall 600 includes a first mitered end 612 and the third side room facing sidewall 606 includes a second mitered end 614 that is configured to abut the first mitered end 612, forming the first joint 510. The first side room facing sidewall 600 includes (e.g., defines) a pocket 616 and the third side room facing sidewall 606 includes (e.g., defines) a tongue 618. The tongue 618 is configured to be received in the pocket 616 when the first side 502 is coupled to the third side 506. A tongue insertion length 619 may be less than or equal to a pocket insertion depth 621. The tongue insertion length 619 may decrease in a direction of the third side upstanding sidewall 610 as a result of the taper of the second mitered end 614.

As shown, when the first side 502 is coupled to the third side 506, the tongue 618 extends over at least a portion of the first joint 510, obscuring at least a portion of a gap that extends at the first joint 510. A tongue width 620 may be less than a sidewall width 622 of the third side room facing sidewall 606, forming an open region 624. The open region 624 extends between the tongue 618 and the third side upstanding sidewall 610 and has an open region width 626. The open region width 626 may be substantially (e.g., with 1%, 2%, 3%, 4%, or 5% of) equal to a distance that a T-grid overlaps the frame 500 when the frame 500 is received within a T-grid of a ceiling. The tongue width 620 may, for example, be at least 40%, 50%, 60%, or 70% of the sidewall width 622.

When the first side 502 is coupled to the second side 506, the tongue 618 is positioned between the first side room facing sidewall 600 and the first side ceiling facing sidewall 602. Such a configuration may obscure the tongue 618 from view when the frame 500 is received within a ceiling. However, other configurations are possible. For example, the tongue 618 may be positioned below the first side room facing sidewall 600 such that the tongue 618 is visible when the frame 500 is received within a ceiling.

As shown, the tongue 618 may include first and second chamfered regions 628 and 630. The chamfered regions 628 and 630 may be positioned at an insertion end 632 of the tongue 618. For example, the chamfered regions 628 and 630 may be positioned at the insertion end 632 on opposing sides of the tongue 618.

The first side ceiling facing sidewall 602 may include a mounting bracket 634 having a bracket opening 636. The mounting bracket 634 may assist with assembly and/or alignment. The mounting bracket 634 may extend along at least a portion of the third side upstanding sidewall 610 when the first side 502 is coupled to the third side 506. The third side upstanding sidewall 610 includes a mounting opening 638. The mounting opening 638 is configured to cooperate with the bracket opening 636 to receive a fastener to couple the first side 502 to the third side 506. For example, the mounting opening 638 and the bracket opening 636 can be configured such that a threaded fastener (e.g., a bolt or screw) can be received therein.

Figure 7:
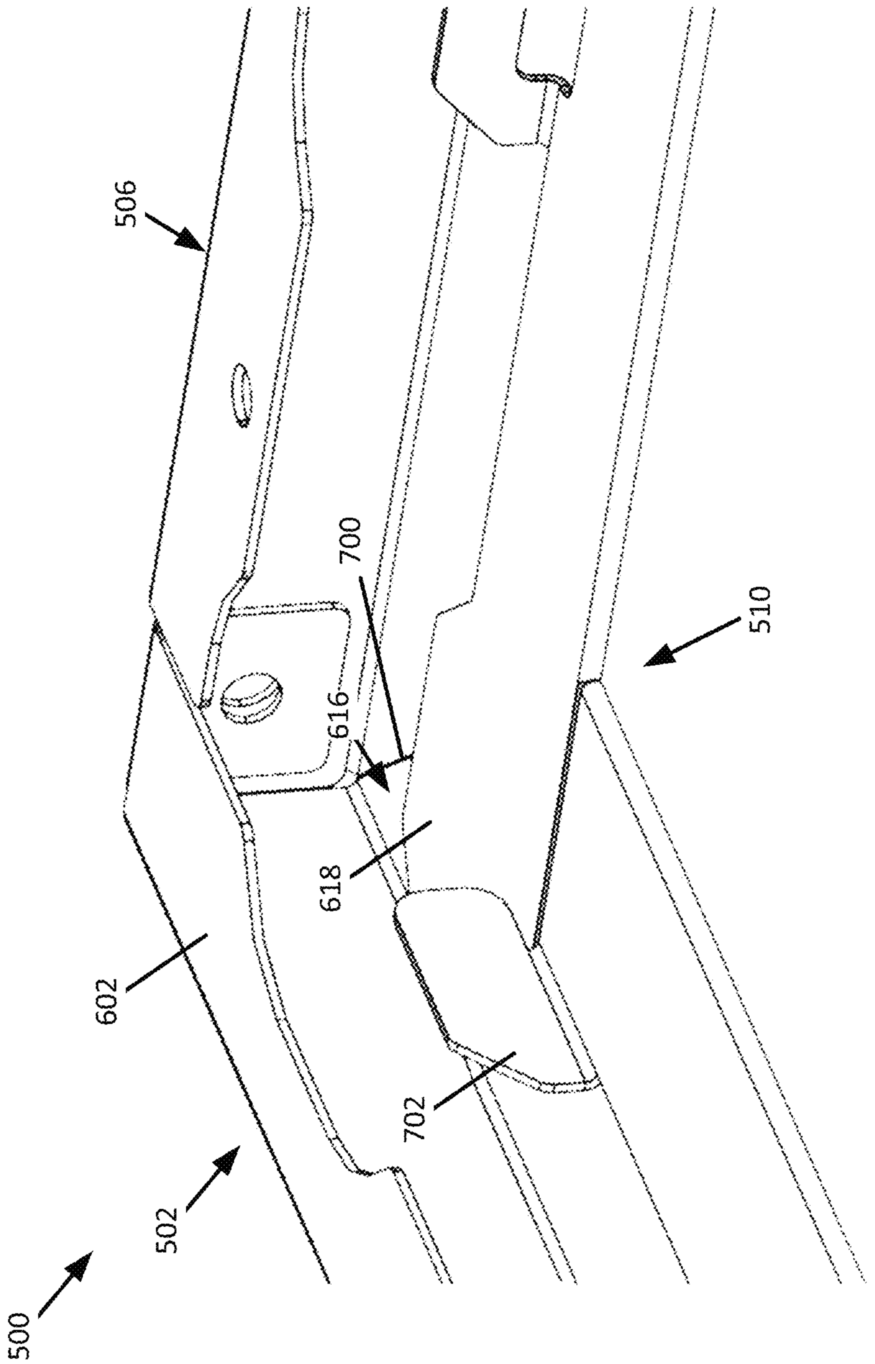
FIG. 7 shows a perspective assembled view of the joint of FIG. 6, consistent with embodiments of the present disclosure.

FIG. 7 shows a magnified assembled view of a portion of the frame 500 that includes the first joint 510. As shown, when the first side 502 is coupled with the third side 506, at least a portion of the tongue 618 is received within the pocket 616, obscuring at least a portion of a gap 700 formed at the first joint 510. In some instances, the tongue 618 may be sized and shaped such that the entire gap 700 is obscured by the tongue 618.

The first side room facing sidewall 600 may include an alignment tab 702 configured to extend over at least a portion of the tongue 618 when the tongue 618 is received within the pocket 616. The alignment tab 702 may be configured to constrain movement of the tongue 618 in a direction of the first side ceiling facing sidewall 602 and/or in a longitudinal direction when the tongue 618 is received within the pocket 616.

Figure 8:
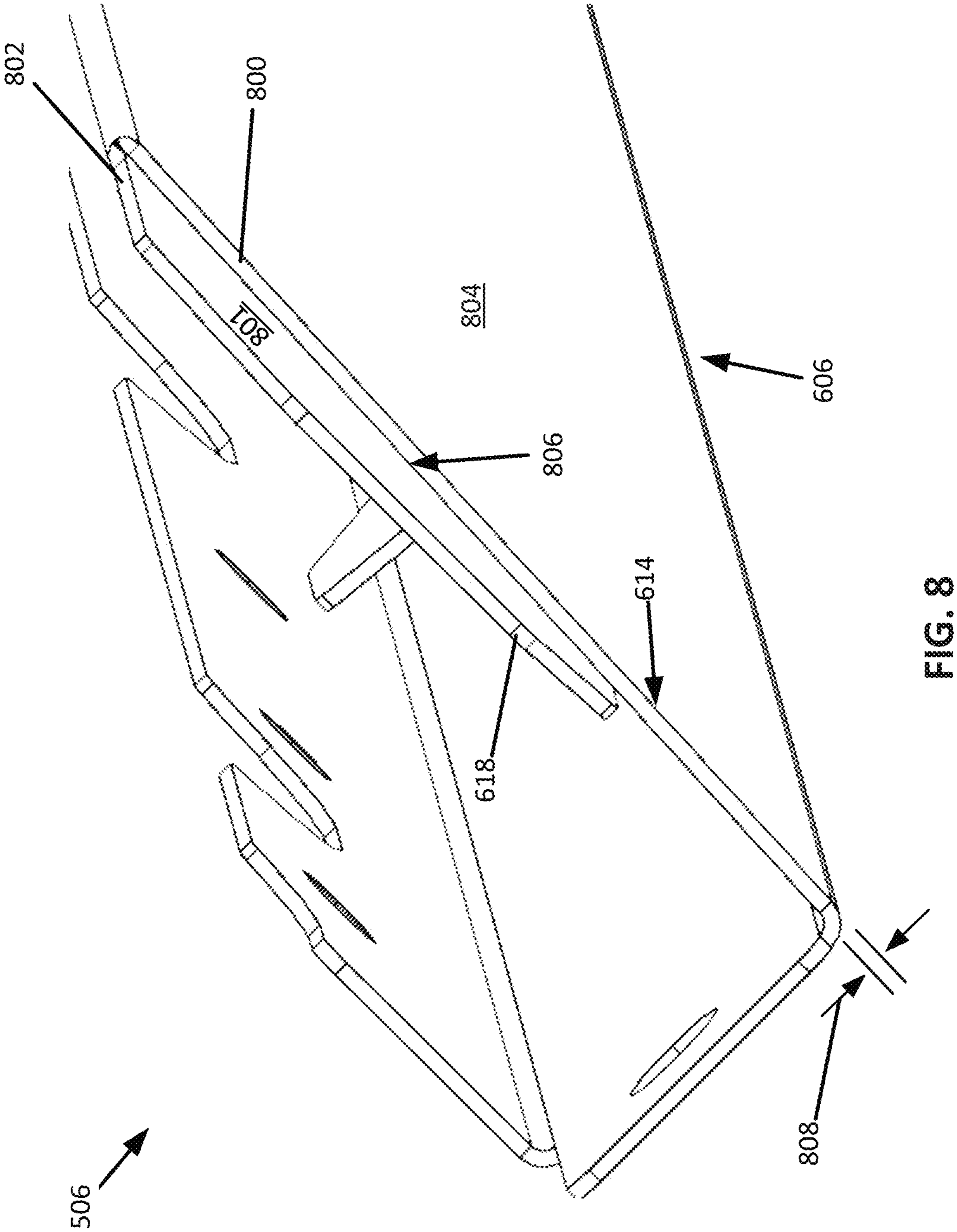
FIG. 8 shows a magnified perspective end view of one side of the frame of FIG. 5, consistent with embodiments of the present disclosure.

FIG. 8 shows a magnified perspective end view of the third side 506. As shown, the third side room facing sidewall 606 includes at least a first layer 800 and a second layer 802. The first layer 800 includes a room facing surface 804 and a ceiling facing surface 806 opposite the room facing surface 804. The second layer 802 extends along the ceiling facing surface 806 of the first layer 800. The second layer 802 includes (e.g., defines) the tongue 618. As shown, a room facing surface 801 of the tongue 618 is spaced apart from the room facing surface 804 of the first layer 800 by a separation distance 808. The separation distance 808 may be equal to or greater than a thickness of the first layer 800. For example, in some instances, the ceiling facing surface 806 of the first layer 800 may be in direct contact with the second layer 802 such that the separation distance 808 is zero. As also shown, the first layer 800 defines the second mitered end 614 of the third side.

Figure 9:
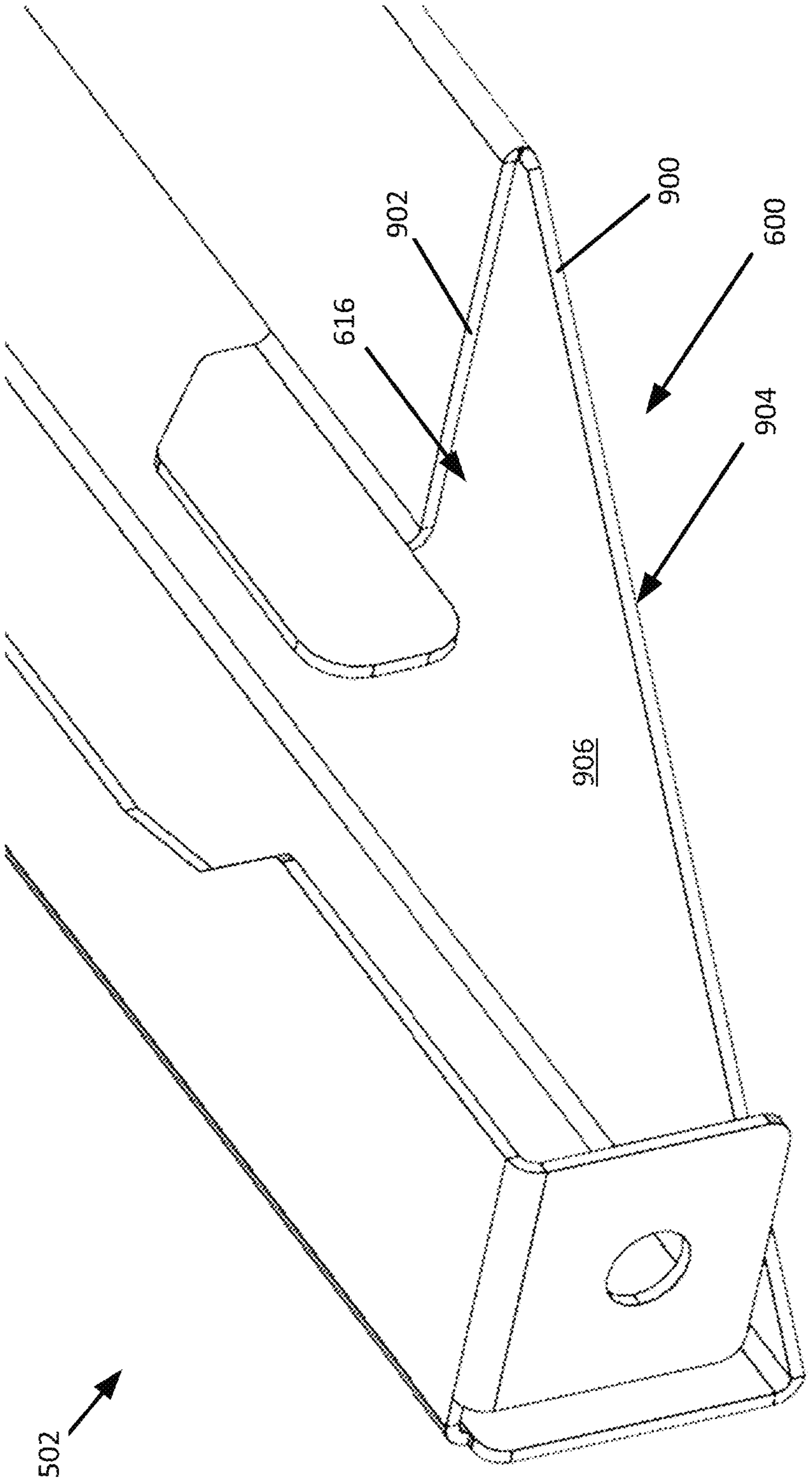
FIG. 9 shows a magnified perspective end view of another side of the frame of FIG. 5, consistent with embodiments of the present disclosure.

FIG. 9 shows a magnified perspective end view of the first side 502. As shown, the first side room facing sidewall 600 includes at least a first layer 900 and a second layer 902. The first layer 900 includes a room facing surface 904 and a ceiling facing surface 906 opposite the room facing surface 904. The second layer 902 extends along the ceiling facing surface 906 of the first layer 900. The second layer 902 includes (e.g., defines) at least a portion of the pocket 616 and at least a portion of the ceiling facing surface 906 may define at least a portion of the pocket 616. In other words, the second layer 902 and the first layer 900 may collectively form at least a portion of the pocket 616.

As shown in FIGS. 8 and 9, the first side 502 and the third side 506 may each be formed of a single sheet of material (e.g., a metal, such as a steel alloy or aluminum alloy). As such, each of the second layers 802 and 902 may be formed by folding the single sheet of material over on itself. Similarly, each of the second and fourth sides 504 and 508 may be formed of a single sheet of material (e.g., a metal, such as a steel alloy or aluminum alloy) that is folded to form one or more (e.g., each of) the features of the corresponding side 504 or 508.

While FIGS. 6-9 only show the construction of the first joint 510, the second, third, and fourth joints 512, 514, and 516 may have a similar construction. For example, opposing ends of third side 506 and fourth side 508 may each include tongues 618 and opposing ends of the first side 502 and second side 504 may each include pockets 616 for receiving a respective tongue 618. By way of further example, one opposing end of each of the first, second, third, and fourth sides 502, 504, 506, and 508 may include the tongue 618 and the other opposing end of each of the first, second, third, and fourth sides 502, 504, 506, and 508 may include the pocket 616.

Figure 10:
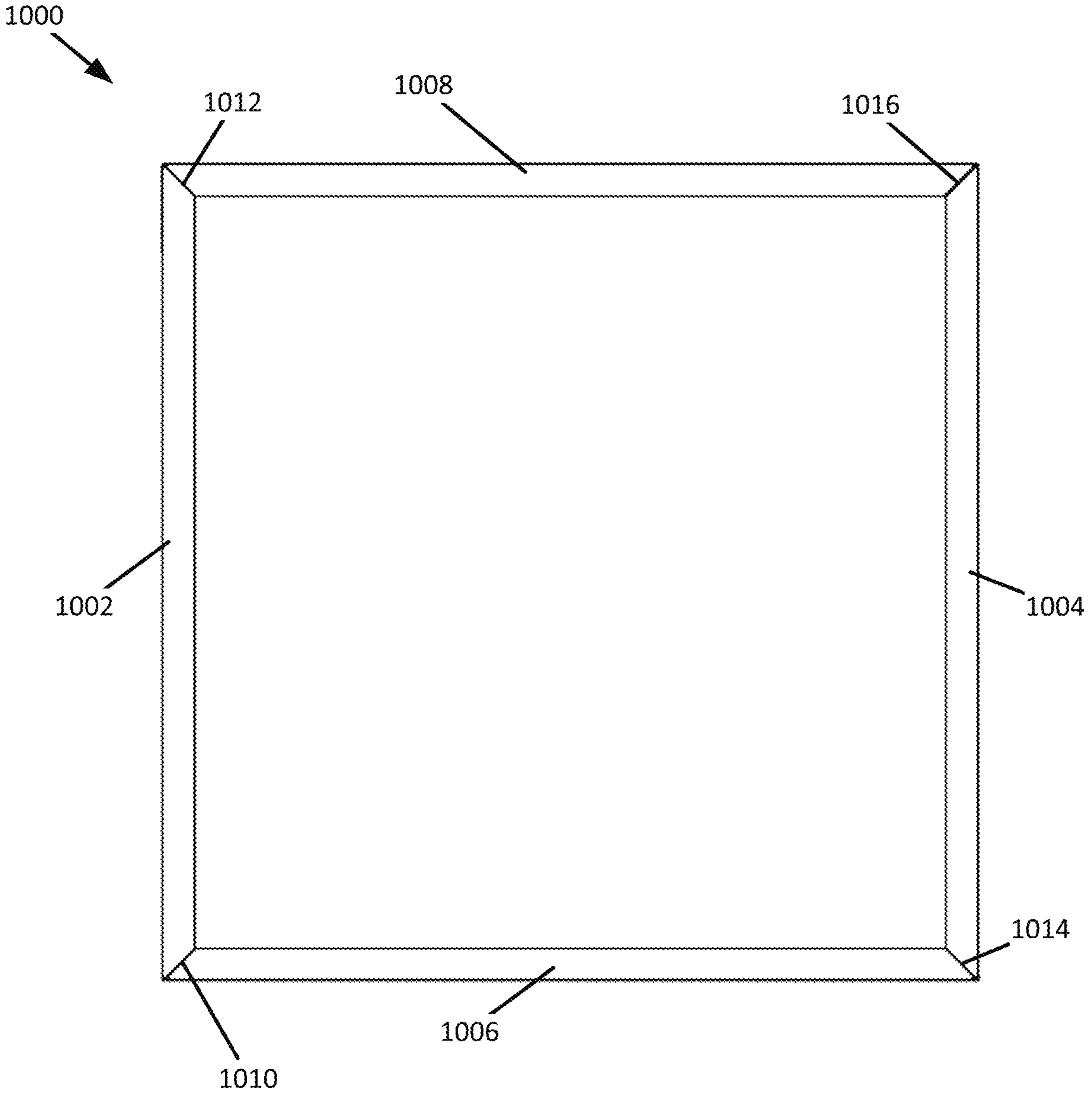
FIG. 10 shows a side view of another example of a frame for a lighting fixture, consistent with embodiments of the present disclosure.

FIG. 10 shows a frame 1000, which is an example of the frame 202 of FIG. 2. As shown, the frame 1000 includes a first side 1002, a second side 1004, a third side 1006, and a fourth side 1008. Opposing distal ends of the first side 1002 abut corresponding distal ends of the third side 1006 and the fourth side 1008 to form first and second joints 1010 and 1012. Opposing distal ends of the second side 1004 abut corresponding distal ends of the third side 1006 and the fourth side 1008 to form third and fourth joints 1014 and 1016.

Figure 11:
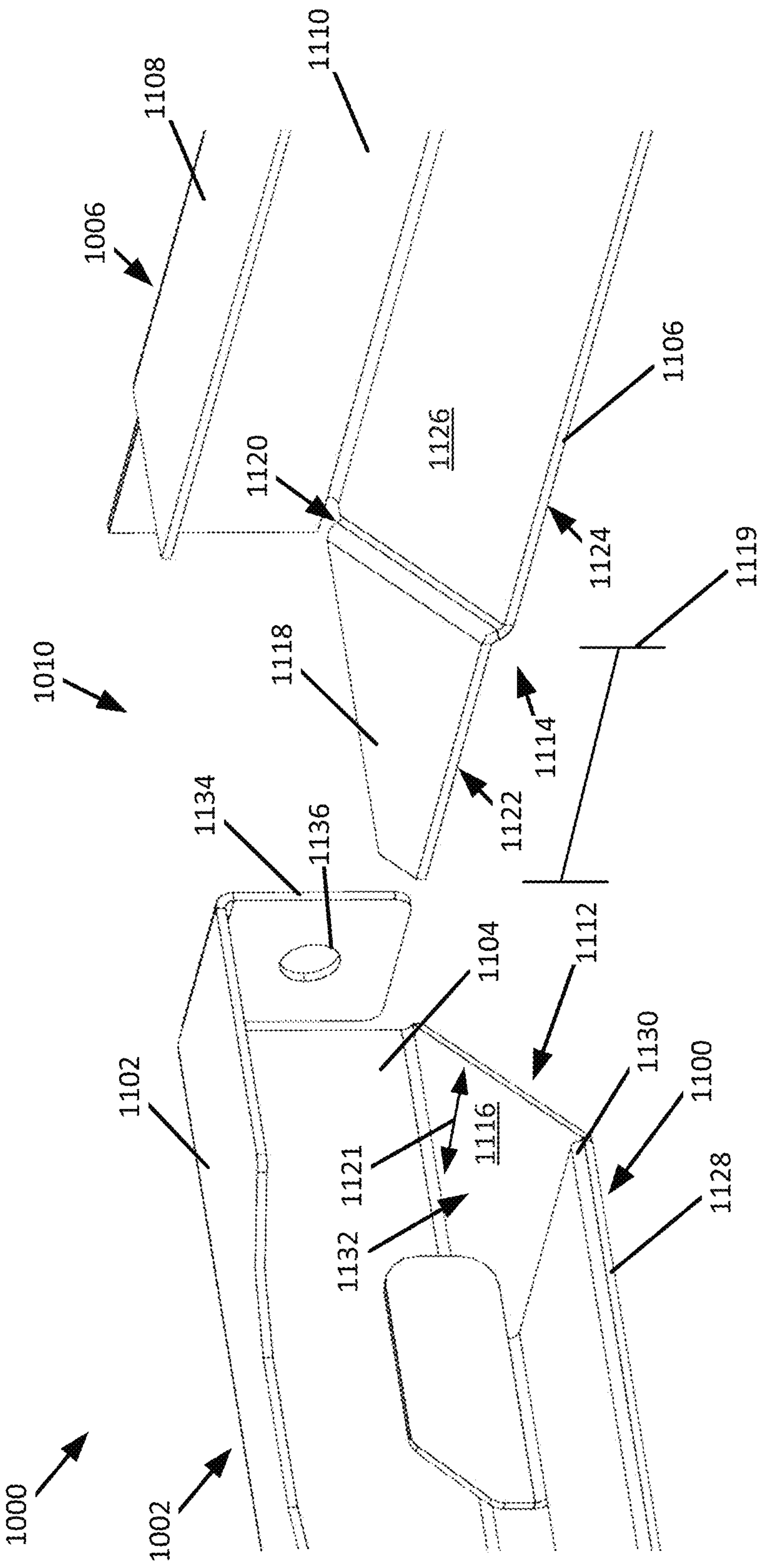
FIG. 11 shows an exploded perspective view of a joint of the frame of FIG. 10, consistent with embodiments of the present disclosure.

FIG. 11 shows a magnified exploded view of a portion of the frame 1000 that includes the first joint 1010. As shown, the first side 1002 includes a first side room facing sidewall 1100, a first side ceiling facing sidewall 1102 vertically spaced apart from the first side room facing sidewall 1100, and a first side upstanding sidewall 1104 extending from the first side room facing sidewall 1100 to the first side ceiling facing sidewall 1102. As also shown, the third side 1006 includes a third side room facing sidewall 1106, a third side ceiling facing sidewall 1108 vertically spaced apart from the third side room facing sidewall 1106, and a third side upstanding sidewall 1110 extending from the third side room facing sidewall 1106 to the third side ceiling facing sidewall 1108.

The first side room facing sidewall 1100 includes a first mitered end 1112 and the third side room facing sidewall 1106 includes a second mitered end 1114 that is configured to abut the first mitered end 1112, forming the first joint 1010. The first side room facing sidewall 1100 includes (e.g., defines) a pocket 1116 and the third side room facing sidewall 1106 includes (e.g., defines) a tongue 1118. The tongue 1118 is configured to be received by the pocket 1116 when the first side 1002 is coupled to the third side 1006. A tongue insertion length 1119 may be less than or equal to a pocket insertion depth 1121.

As shown, the third side room facing sidewall 1106 includes an inclined region 1120 that extends from the third side room facing sidewall 1106 towards the third side ceiling facing sidewall 1108. The tongue 1118 extends from the inclined region 1120 such that a room facing surface 1122 of the tongue is disposed between a room facing surface 1124 of the third side room facing sidewall 1106 and the third side ceiling facing sidewall 1108 (e.g., at or above a ceiling facing surface 1126 of the third side room facing sidewall 1106).

When the first side 1002 is coupled to the third side 1006, the tongue 1118 extends over at least a portion of the first joint 1010, obscuring at least a portion of a gap that extends at the first joint 1010. When the first side 1002 is coupled to the second side 1006, the tongue 1118 is positioned between the first side room facing sidewall 1100 and the first side ceiling facing sidewall 1102. Such a configuration may obscure the tongue 1118 from view when the frame 1000 is received within a ceiling. However, other configurations are possible. For example, the tongue 1118 may be positioned below the first side room facing sidewall 1100 such that the tongue 1118 is visible when the frame 1000 is received within a ceiling.

As shown, the first side room facing sidewall 1100 includes at least a first layer 1128 and a second layer 1130. The second layer 902 extends over a ceiling facing surface 1132 of the first layer 1128. The second layer 1130 includes (e.g., defines) at least a portion of the pocket 1116 and at least a portion of the ceiling facing surface 1132 may define at least a portion of the pocket 1116. In other words, the second layer 1130 and the first layer 1128 may collectively form at least a portion of the pocket 1116.

The first side ceiling facing sidewall 1102 may include a mounting bracket 1134 having a bracket opening 1136. The mounting bracket 1134 may assist with assembly and/or alignment. The mounting bracket 1134 may extend along at least a portion of the third side upstanding sidewall 1110. The third side upstanding sidewall 1110 may include a mounting opening that is configured to cooperate with the bracket opening 1136 to receive a fastener to couple the first side 1002 to the third side 1006. For example, the bracket opening 1136 can be configured such that a threaded fastener can be received therein, wherein the threaded fastener is configured to form the mounting opening in the third side upstanding sidewall 1110.

Figure 12:
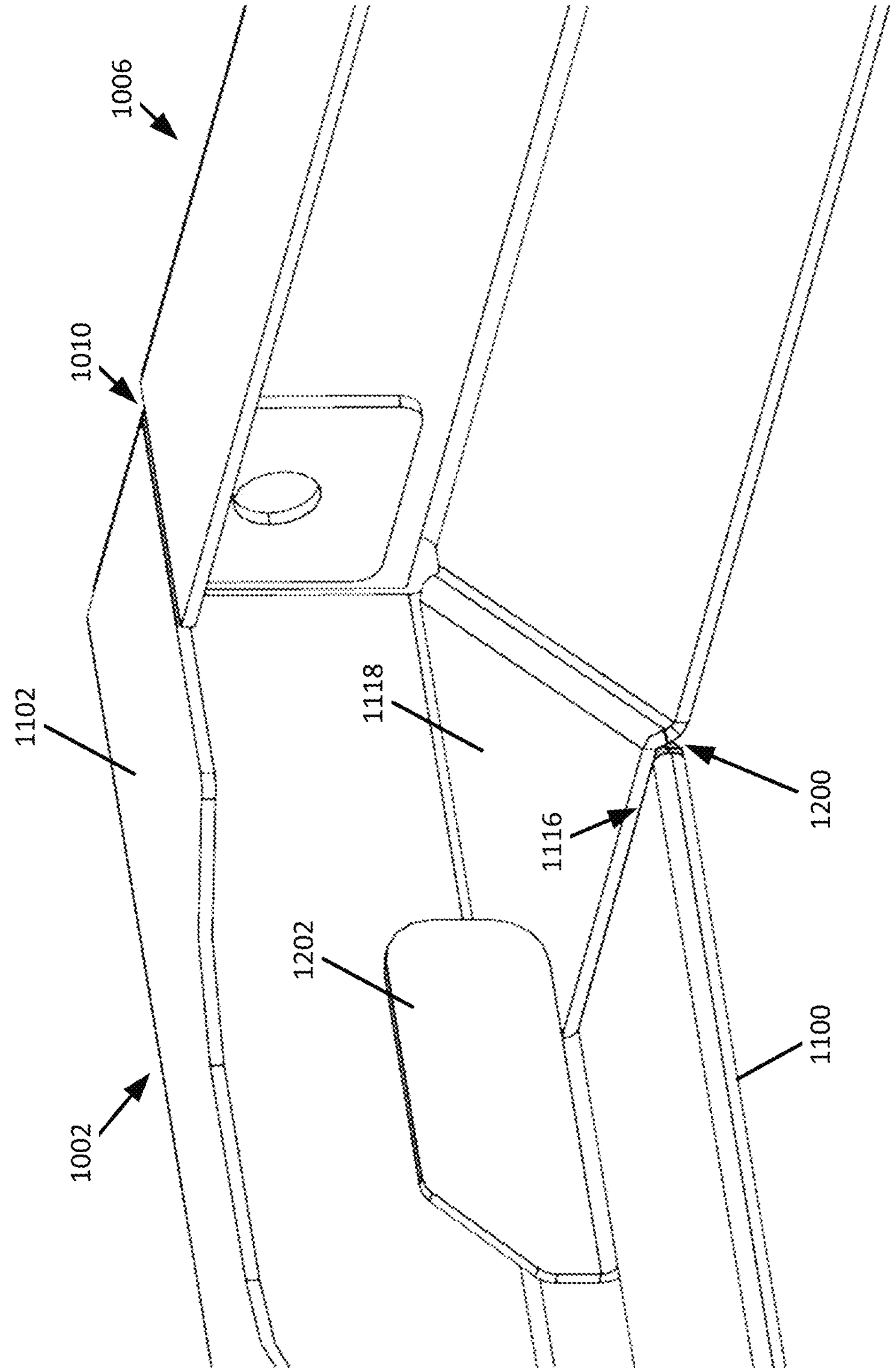
FIG. 12 shows a perspective assembled view of the joint of FIG. 11, consistent with embodiments of the present disclosure.

FIG. 12 shows a magnified assembled view of a portion of the frame 1000 that includes the first joint 1010. As shown, when the first side 1002 is coupled with the third side 1006, at least a portion of the tongue 1118 is received within the pocket 1116, obscuring at least a portion of a gap 1200 formed at the first joint 1010. In some instances, the tongue 1118 may be sized and shaped such that the entire gap 1200 is obscured by the tongue 1118. In some instances, a portion of the tongue 1118 may extend from the pocket 1116 in a direction of first side ceiling facing sidewall 1102. In other words, a depth of the pocket 1116 may be less than a thickness of the tongue 1118.

The first side room facing sidewall 1100 may include an alignment tab 1202 configured to extend over at least a portion of the tongue 1118 when the tongue 1118 is received within the pocket 1116. The alignment tab 1202 may be configured to constrain movement of the tongue 1118 in a direction of the first side ceiling facing sidewall 1102 and/or in a longitudinal direction when the tongue 1118 is received within the pocket 1116.

As shown in FIGS. 11 and 12, the first side 1002 and the third side 1006 may each be formed of a single sheet of material (e.g., a metal, such as a steel alloy or aluminum alloy) that is folded to form one or more (e.g., each of) the features of the corresponding side 1002 or 1006. Similarly, the second and fourth sides 1004 and 1008 may each be formed of a single sheet of material (e.g., a metal, such as a steel alloy or aluminum alloy) that is folded to form one or more (e.g., each of) the features of the corresponding side 1004 or 1008.

While FIGS. 11 and 12 only show the construction of the first joint 1010, the second, third, and fourth joints 1012, 1014, and 1016 may have a similar construction. For example, opposing ends of third side 1006 and fourth side 1008 may each include tongues 1118 and opposing ends of the first side 1002 and second side 1004 may each include pockets 1116 for receiving a respective tongue 1118. By way of further example, one opposing end of each of the first, second, third, and fourth sides 1002, 1004, 1006, and 1008 may include the tongue 1118 and the other opposing end of each of the first, second, third, and fourth sides 1002, 1004, 1006, and 1008 may include the pocket 1116.

Figure 13:
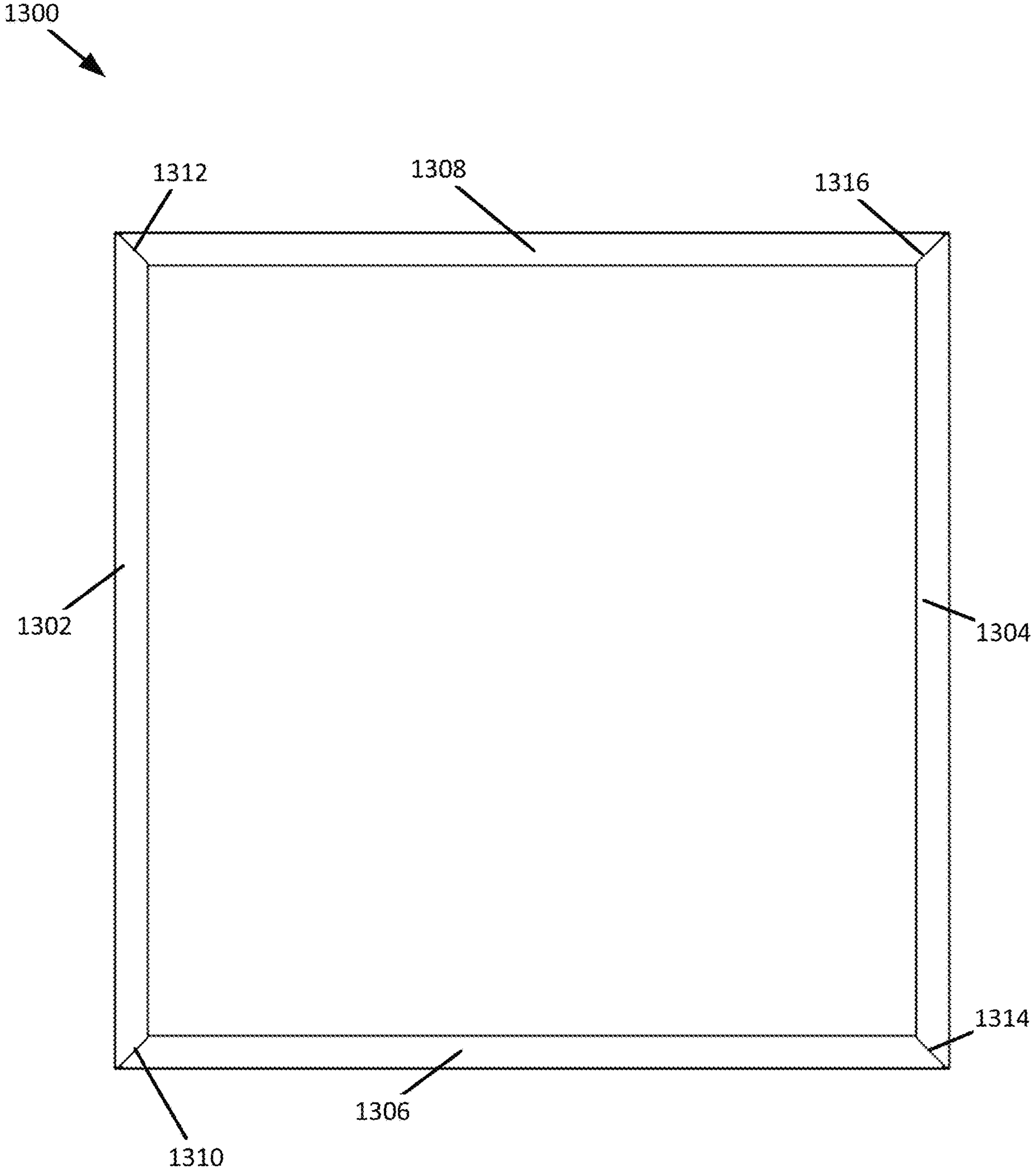
FIG. 13 shows a side view of an example of a frame for a lighting fixture, consistent with embodiments of the present disclosure.

FIG. 13 shows a frame 1300, which is an example of the frame 202 of FIG. 2. As shown, the frame 1300 includes a first side 1302, a second side 1304, a third side 1306, and a fourth side 1308. Opposing distal ends of the first side 1302 abut corresponding distal ends of the third side 1306 and the fourth side 1308 to form first and second joints 1310 and 1312. Opposing distal ends of the second side 1304 abut corresponding distal ends of the third side 1306 and the fourth side 1308 to form third and fourth joints 1314 and 1316.

Figure 14:
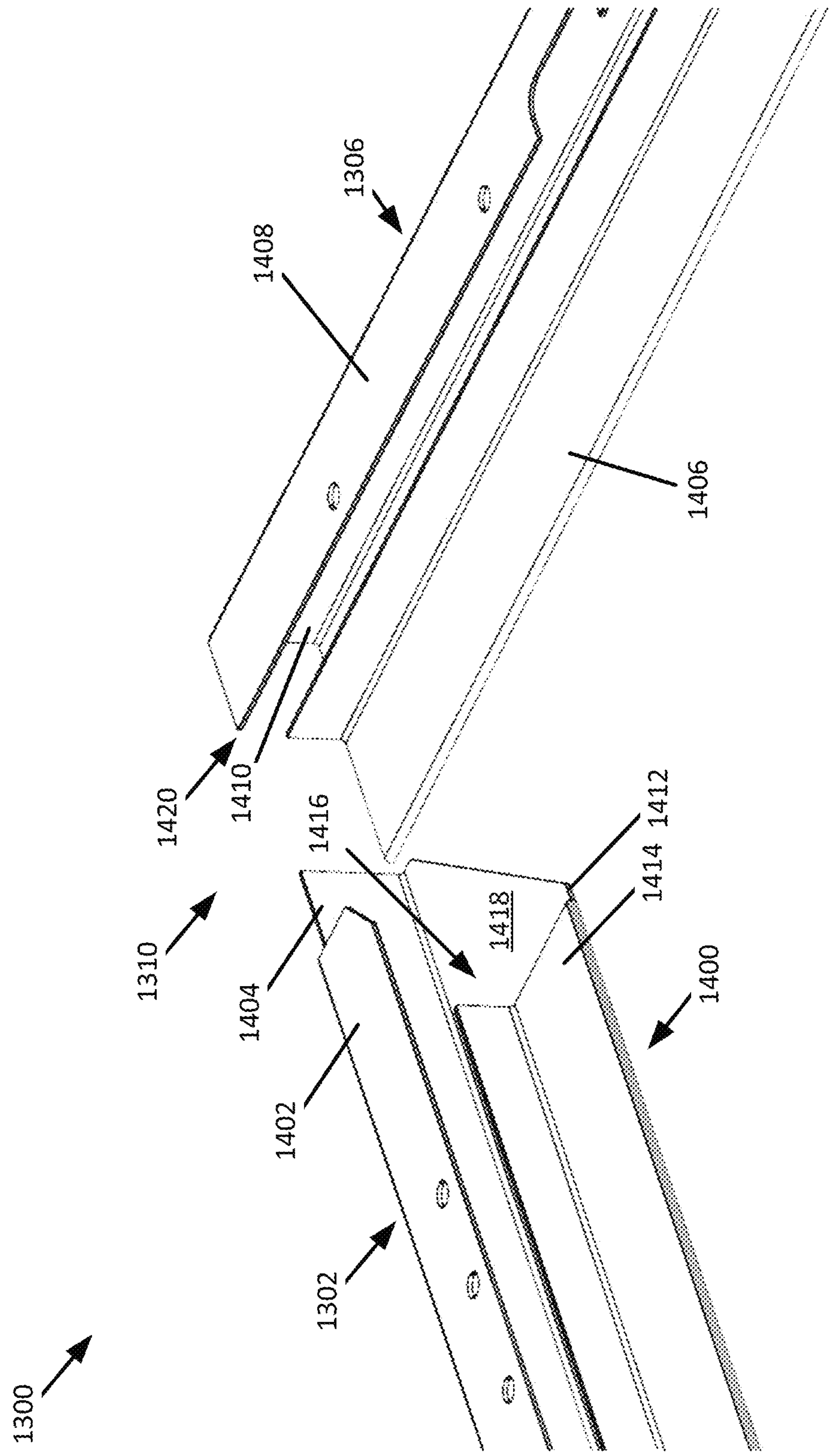
FIG. 14 shows an exploded perspective view of a joint of the frame of FIG. 13, consistent with embodiments of the present disclosure.

FIG. 14 shows a magnified exploded view of a portion of the frame 1300 that includes the first joint 1310. As shown, the first side 1302 includes a first side room facing sidewall 1400, a first side ceiling facing sidewall 1402 vertically spaced apart from the first side room facing sidewall 1400, and a first side upstanding sidewall 1404 extending from the first side room facing sidewall 1400 to the first side ceiling facing sidewall 1402. As also shown, the third side 1306 includes a third side room facing sidewall 1406, a third side ceiling facing sidewall 1408 vertically spaced apart from the third side room facing sidewall 1406, and a third side upstanding sidewall 1410 extending from the third side room facing sidewall 1406 to the third side ceiling facing sidewall 1408.

As shown, the first side room facing sidewall 1400 includes at least a first layer 1412 and a second layer 1414. The second layer 1414 extends over a ceiling facing surface 1416 of the first layer 1412. The second layer 1414 includes (e.g., defines) at least a portion of a pocket 1418 and at least a portion of the ceiling facing surface 1416 may define at least a portion of the pocket 1418. In other words, the second layer 1414 and the first layer 1412 may collectively form at least a portion of the pocket 1418.

The pocket 1418 is configured to receive at least a portion of a distal end 1420 of the third side 1306. For example, a portion of the third side room facing sidewall 1406 may be received within the pocket 1418 such that a portion of the third side room facing sidewall 1406 is disposed between the first side room facing sidewall 1400 and the first side ceiling facing sidewall 1402 when the third side 1306 is coupled to the first side 1302. In other words, at least a portion of the first side room facing sidewall 1400 overlaps at least a portion of the third side room facing sidewall 1406 when the third side 1306 is coupled to the first side 1302. Such a configuration may obscure at least a portion of a gap that extends at the first joint 1310.

Figure 15:
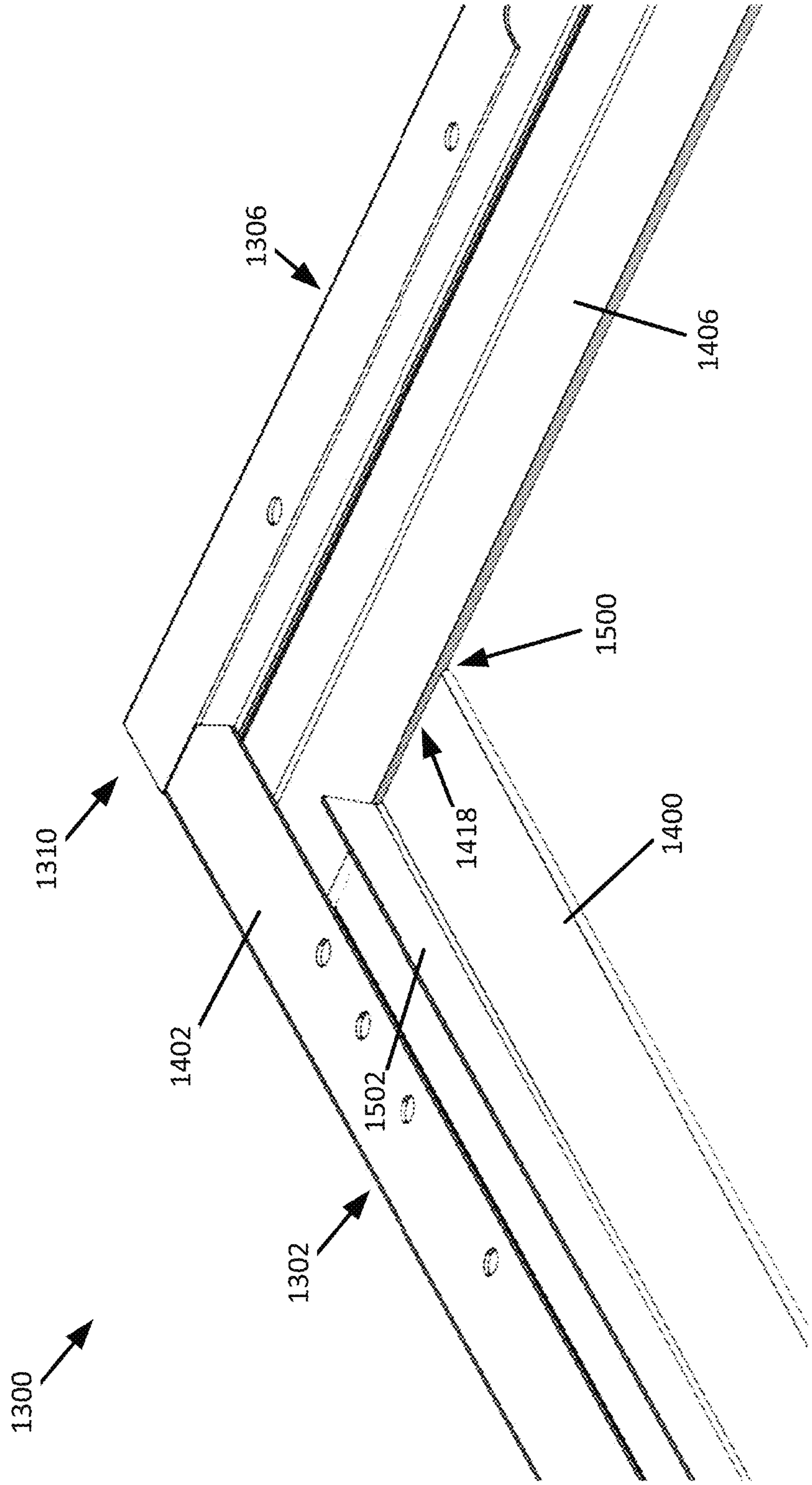
FIG. 15 shows an assembled perspective view of the joint of FIG. 14, consistent with embodiments of the present disclosure.

FIG. 15 shows a magnified assembled view of a portion of the frame 1300 that includes the first joint 1310. As shown, when the first side 1302 is coupled with the third side 1306, at least a portion of the third side room facing sidewall 1406 is receive within the pocket 1418, obscuring at least a portion of a gap 1500 formed at the first joint 1310. In some instances, a portion of the third side room facing sidewall 1406 may extend from the pocket 1418 in a direction of the first side ceiling facing sidewall 1402. In other words, a depth of the pocket 1418 may be less than a thickness of the third side room facing sidewall 1406.

Figure 16:
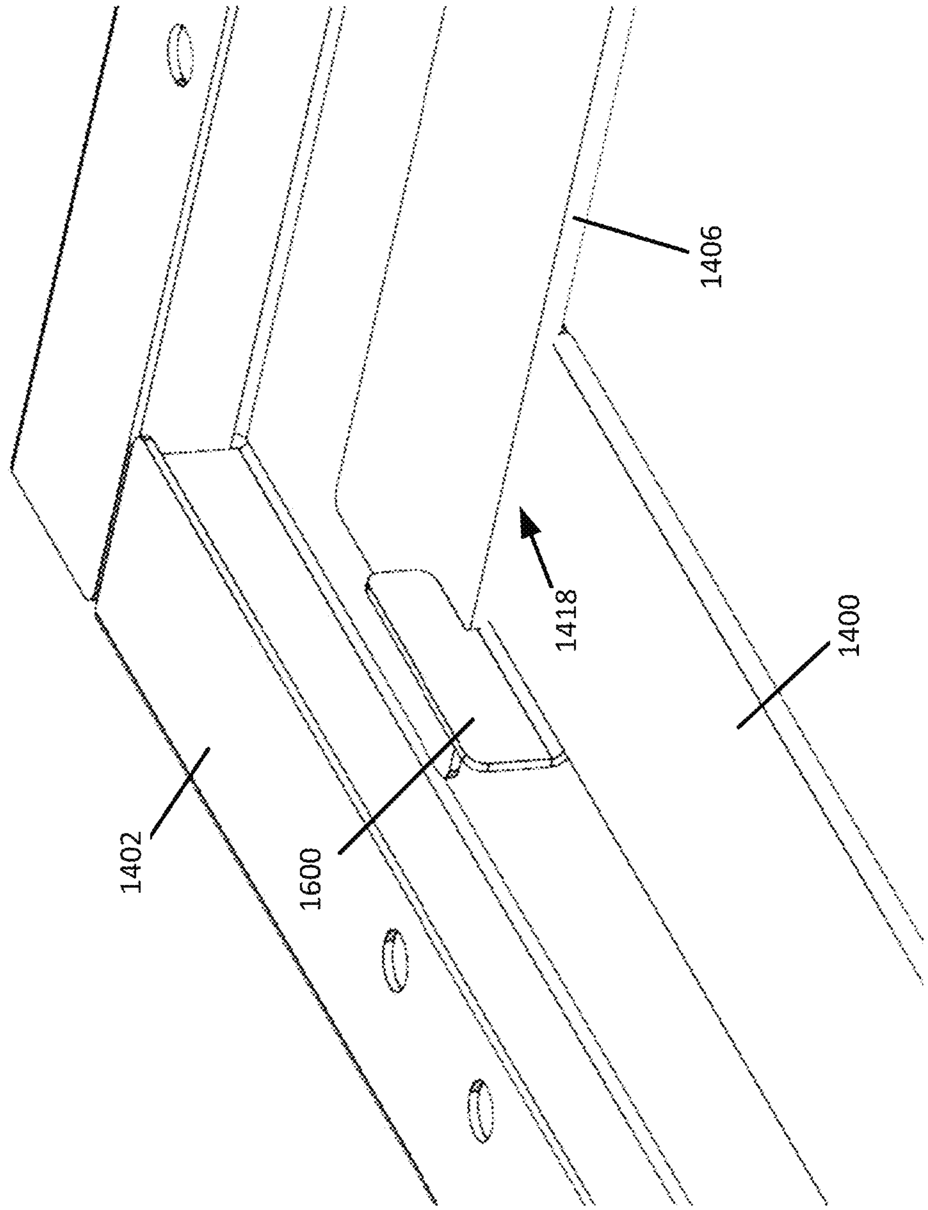
FIG. 16 shows an assembled perspective view of another example of the joint of FIG. 14, consistent with embodiments of the present disclosure.

The first side room facing sidewall 1400 may include an alignment tab 1502. The alignment tab 1502 may be configured to constrain longitudinal movement of the third side 1306 along the first side room facing sidewall 1400. Additionally, or alternatively, and as shown in FIG. 16, the first side room facing sidewall 1400 may include an alignment tab 1600. As shown, the alignment tab 1600 may be configured to extend over at least a portion of the third side room facing sidewall 1406 when the third side room facing sidewall 1406 is received within the pocket 1418. The alignment tab 1600 may be configured to constrain movement of the third side room facing sidewall 1406 in a direction of the first side ceiling facing sidewall 1402 and/or in a longitudinal direction when the third side room facing sidewall 1406 is received within the pocket 1418.

As shown in FIGS. 14-16, the first side 1302 and the third side 1306 may each be formed of a single sheet of material (e.g., a metal, such as a steel alloy or aluminum alloy) that is folded to form one or more (e.g., each of) the features of the corresponding side 1302 or 1306. Similarly, the second and fourth sides 1304 and 1308 may each be formed of a single sheet of material (e.g., a metal, such as a steel alloy or aluminum alloy) that is folded to form one or more (e.g., each of) the features of the corresponding side 1304 or 1308.

While FIGS. 14-16 only show the construction of the first joint 1310, the second, third, and fourth joints 1312, 1314, and 1316 may have a similar construction. For example, opposing ends of the first side 1302 and second side 1304 may each include pockets 1418 for receiving a respective portion of the third side 1306 or fourth side 1308. By way of further example, one opposing end of each of the first, second, third, and fourth sides 1002, 1004, 1006, and 1008 may include the pocket 1418 and the other opposing end of each of the first, second, third, and fourth sides 1002, 1004, 1006, and 1008 may be received within a corresponding pocket 1418.

An example of a lighting fixture, consistent with the present disclosure, may include a housing, an illumination source disposed within the housing, and a frame coupled to the housing. The frame may include a first side and a second side abutting the first side to form a joint, wherein a gap extends at the joint and at least one of the first side or the second side is configured to obscure at least a portion of the gap.

In some instances, the first side may define a pocket and the second side may define a tongue, the tongue being received within the pocket and obscuring at least a portion of the gap. In some instances, the second side may include an inclined region and the tongue extends from the inclined region. In some instances, the first side may include a first layer and a second layer, the second layer defining the tongue. In some instances, the first side may include an alignment tab configured to constrain movement of the tongue within the pocket. In some instances, the first side may include a first side room facing sidewall, a first side ceiling facing sidewall, and a first side upstanding sidewall extending from the first side room facing sidewall to the first side ceiling facing sidewall and the second side may include a second side room facing sidewall, a second side ceiling facing sidewall, and a second side upstanding sidewall extending from the second side room facing sidewall to the second side ceiling facing sidewall. In some instances, the first side room facing sidewall may include a pocket that receives at least a portion of the second side room facing sidewall, obscuring at least portion of the gap. In some instances, the second side room facing sidewall may include a tongue and the first side room facing sidewall includes a pocket that receives the tongue, the tongue obscuring at least a portion of the gap. In some instances, the second side room facing sidewall may include a first layer and a second layer and the tongue is defined by the second layer. In some instances, the first side room facing sidewall may include an alignment tab configured to constrain movement of the second side room facing sidewall in a direction of the first side ceiling facing sidewall.

An example of a lighting fixture panel, consistent with the present disclosure, may include a diffuser and a frame defining an open area, the diffuser extending over the open area. The frame may include a first side and a second side abutting the first side to form a joint, wherein a gap extends at the joint and at least one of the first side or the second side is configured to obscure at least a portion of the gap.

In some instances, the first side may define a pocket and the second side may define a tongue, the tongue being received within the pocket and obscuring at least a portion of the gap. In some instances, the second side may include an inclined region and the tongue extends from the inclined region. In some instances, the first side may include a first layer and a second layer, the second layer defining the tongue. In some instances, the first side may include an alignment tab configured to constrain movement of the tongue within the pocket. In some instances, the first side may include a first side room facing sidewall, a first side ceiling facing sidewall, and a first side upstanding sidewall extending from the first side room facing sidewall to the first side ceiling facing sidewall and the second side may include a second side room facing sidewall, a second side ceiling facing sidewall, and a second side upstanding sidewall extending from the second side room facing sidewall to the second side ceiling facing sidewall. In some instances, the first side room facing sidewall may include a pocket that receives at least a portion of the second side room facing sidewall, obscuring at least portion of the gap. In some instances, the second side room facing sidewall may include a tongue and the first side room facing sidewall includes a pocket that receives the tongue, the tongue obscuring at least a portion of the gap. In some instances, the second side room facing sidewall may include a first layer and a second layer and the tongue is defined by the second layer. In some instances, the tongue may be disposed between the first side room facing sidewall and the first side ceiling facing sidewall.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A lighting fixture comprising:

a housing;

an illumination source disposed within the housing; and a frame coupled to the housing, the frame including:

a first side having a first side longitudinal axis; and a second side having a second side longitudinal axis, the second side abutting the first side to form a joint, the second side longitudinal axis extends transverse to the first side longitudinal axis and intersects the first side longitudinal axis at the joint, wherein a gap extends at the joint and at least one of the first side or the second side is configured to obscure at least a portion of the gap.

2. The lighting fixture of claim 1, wherein the first side defines a pocket and the second side defines a tongue, the tongue being received within the pocket and obscuring at least a portion of the gap.

3. The lighting fixture of claim 2, wherein the second side includes an inclined region and the tongue extends from the inclined region.

4. The lighting fixture of claim 2, wherein the second first side includes a first layer and a second layer, the second layer defining the tongue.

5. The lighting fixture of claim 2, wherein the first side includes an alignment tab configured to constrain movement of the tongue within the pocket.

6. The lighting fixture of claim 1, wherein:

the first side includes:

a first side room facing sidewall;

a first side ceiling facing sidewall; and a first side upstanding sidewall extending from the first side room facing sidewall to the first side ceiling facing sidewall; and the second side includes:

a second side room facing sidewall;

a second side ceiling facing sidewall; and a second side upstanding sidewall extending from the second side room facing sidewall to the second side ceiling facing sidewall.

7. The lighting fixture of claim 6, wherein the first side room facing sidewall includes a pocket that receives at least a portion of the second side room facing sidewall, obscuring at least portion of the gap.

8. The lighting fixture of claim 6, wherein the second side room facing sidewall includes a tongue and the first side room facing sidewall includes a pocket that receives the tongue, the tongue obscuring at least a portion of the gap.

9. The lighting fixture of claim 8, wherein the second side room facing sidewall includes a first layer and a second layer and the tongue is defined by the second layer.

10. The lighting fixture of claim 6, wherein the first side room facing sidewall includes an alignment tab configured to constrain movement of the second side room facing sidewall in a direction of the first side ceiling facing sidewall.

11. A lighting fixture panel comprising:
a diffuser; and
a frame defining an open area, the diffuser extending over the open area, the frame including:
a first side having a first side longitudinal axis; and
a second side having a second side longitudinal axis, the second side abutting the first side to form a joint, the second side longitudinal axis extends transverse to the first side longitudinal axis and intersects the first side longitudinal axis at the joint, wherein a gap extends at the joint and at least one of the first side or the second side is configured to obscure at least a portion of the gap.

12. The lighting fixture panel of claim 11, wherein the first side defines a pocket and the second side defines a tongue, the tongue being received within the pocket and obscuring at least a portion of the gap.

13. The lighting fixture panel of claim 12, wherein the second side includes an inclined region and the tongue extends from the inclined region.

14. The lighting fixture panel of claim 12, wherein the second side includes a first layer and a second layer, the second layer defining the tongue.

15. The lighting fixture panel of claim 12, wherein the first side includes an alignment tab configured to constrain movement of the tongue within the pocket.

16. The lighting fixture panel of claim 11, wherein:
the first side includes:
a first side room facing sidewall;
a first side ceiling facing sidewall; and
a first side upstanding sidewall extending from the first side room facing sidewall to the first side ceiling facing sidewall; and
the second side includes:
a second side room facing sidewall;

a second side ceiling facing sidewall; and
a second side upstanding sidewall extending from the second side room facing sidewall to the second side ceiling facing sidewall.

17. The lighting fixture panel of claim 16, wherein the first side room facing sidewall includes a pocket that receives at least a portion of the second side room facing sidewall, obscuring at least portion of the gap.

18. The lighting fixture panel of claim 16, wherein the second side room facing sidewall includes a tongue and the first side room facing sidewall includes a pocket that receives the tongue, the tongue obscuring at least a portion of the gap.

19. The lighting fixture panel of claim 18, wherein the second side room facing sidewall includes a first layer and a second layer and the tongue is defined by the second layer.

20. The lighting fixture panel of claim 18, wherein the tongue is disposed between the first side room facing sidewall and the first side ceiling facing sidewall.

21. A lighting fixture comprising:
a housing;
an illumination source disposed within the housing; and
a frame coupled to the housing, the frame including:
a first side having a first side room facing sidewall, a first side ceiling facing sidewall, and a first side upstanding sidewall extending from the first side room facing sidewall to the first side ceiling facing sidewall; and
a second side having a second side room facing sidewall, a second side ceiling facing sidewall, and a second side upstanding sidewall extending from the second side room facing sidewall to the second side ceiling facing sidewall, the second side abutting the first side to form a joint, wherein a gap extends at the joint and at least one of the first side or the second side is configured to obscure at least a portion of the gap.

* * * * *